United States Patent
Jo et al.

(10) Patent No.: US 11,522,169 B2
(45) Date of Patent: Dec. 6, 2022

(54) SULFIDE-BASED ALL-SOLID-STATE BATTERY INCLUDING SURFACE HEAT-TREATED POSITIVE ELECTRODE ACTIVE MATERIAL AND METHOD OF MANUFACTURING THE SAME

(71) Applicants: LG Chem, Ltd., Seoul (KR); The Regents of the University of California, Oakland, CA (US)

(72) Inventors: Chi Ho Jo, Daejeon (KR); Wang Mo Jung, Daejeon (KR); Hyuk In Moon, Gwangju (KR); Ying Shirley Meng, San Diego, CA (US)

(73) Assignees: The Regents of the University of California, Oakland, CA (US); LG Energy Solution, Ltd.

( * ) Notice: Subject to any disclaimer, the term of this patent is extended or adjusted under 35 U.S.C. 154(b) by 226 days.

(21) Appl. No.: 16/992,341

(22) Filed: Aug. 13, 2020

(65) Prior Publication Data
US 2022/0052309 A1    Feb. 17, 2022

(51) Int. Cl.
| | |
|---|---|
| *H01M 4/04* | (2006.01) |
| *H01M 4/525* | (2010.01) |
| *H01M 4/131* | (2010.01) |
| *H01M 4/1391* | (2010.01) |
| *H01M 10/0562* | (2010.01) |
| *H01M 10/058* | (2010.01) |

(Continued)

(52) U.S. Cl.
CPC ......... *H01M 4/0471* (2013.01); *H01M 4/131* (2013.01); *H01M 4/1391* (2013.01); *H01M 4/525* (2013.01); *H01M 10/052* (2013.01); *H01M 10/058* (2013.01); *H01M 10/0562* (2013.01); *H01M 2004/028* (2013.01); *H01M 2300/0068* (2013.01)

(58) Field of Classification Search
CPC .. H01M 4/0471; H01M 4/131; H01M 4/1391; H01M 4/525; H01M 10/052; H01M 10/058; H01M 2004/028; H01M 2300/0068
See application file for complete search history.

(56) References Cited

U.S. PATENT DOCUMENTS

| | | |
|---|---|---|
| 2009/0081554 A1 | 3/2009 | Takada et al. |
| 2015/0037688 A1 | 2/2015 | Otsuka et al. |
| 2016/0181610 A1 | 6/2016 | Shim et al. |

(Continued)

FOREIGN PATENT DOCUMENTS

| | | |
|---|---|---|
| JP | 1982866 B2 | 7/2012 |
| JP | 2015032355 A | 2/2015 |

(Continued)

*Primary Examiner* — Stewart A Fraser
(74) *Attorney, Agent, or Firm* — Lerner, David, Littenberg, Krumholz & Mentlik, LLP

(57) ABSTRACT

Disclosed herein are a method of manufacturing a sulfide-based all-solid-state battery, and a sulfide-based all-solid-state battery manufactured thereby, wherein the battery includes a surface heat-treated positive electrode active material, which is simply performed by heating a positive electrode active material at 400° C. to 600° C. in an inert gas state, as a low-cost method of uniformly treating the surface of a positive electrode active material such that the positive electrode active material does not react with a sulfide-based solid electrolyte.

13 Claims, 9 Drawing Sheets

(51) Int. Cl.
*H01M 10/052* (2010.01)
*H01M 4/02* (2006.01)

(56) References Cited

U.S. PATENT DOCUMENTS

2017/0018767 A1* 1/2017 Park ..................... H01M 4/364
2017/0317342 A1 11/2017 Kang et al.
2021/0194050 A1* 6/2021 Fukushima .............. H01B 1/10

FOREIGN PATENT DOCUMENTS

| KR | 20160040118 A | 4/2016 |
| KR | 20160074739 A | 6/2016 |
| KR | 20180039039 A | 4/2018 |

* cited by examiner

【FIG. 1】
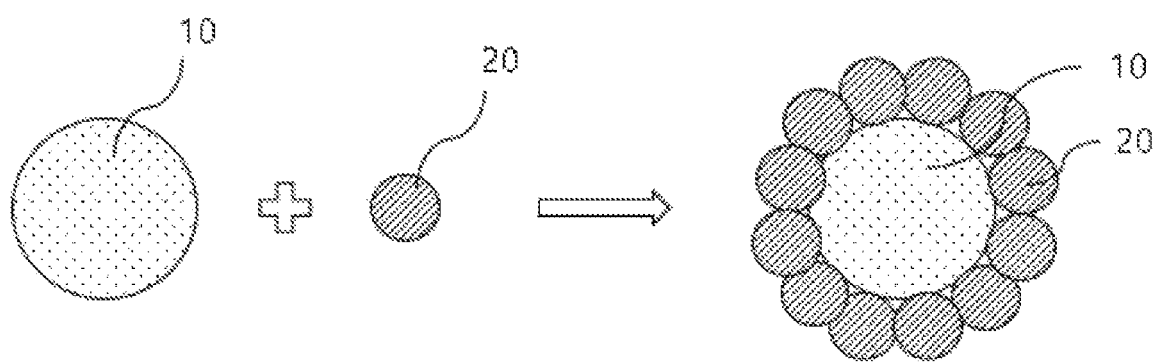

[FIG. 2]
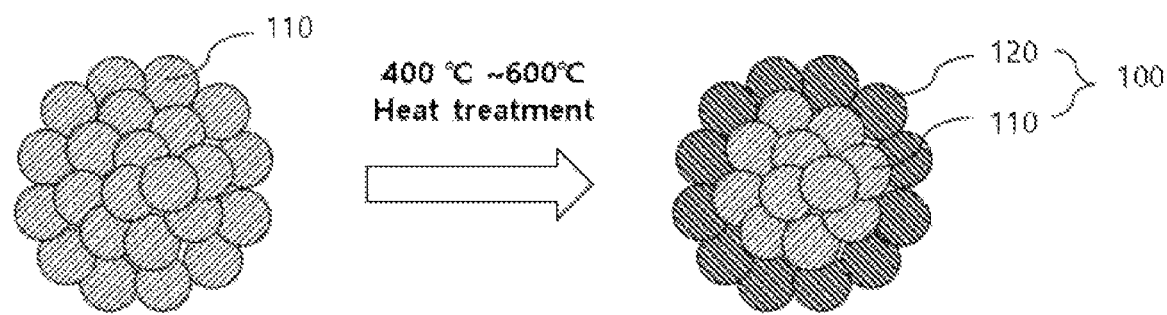

[FIG. 3]
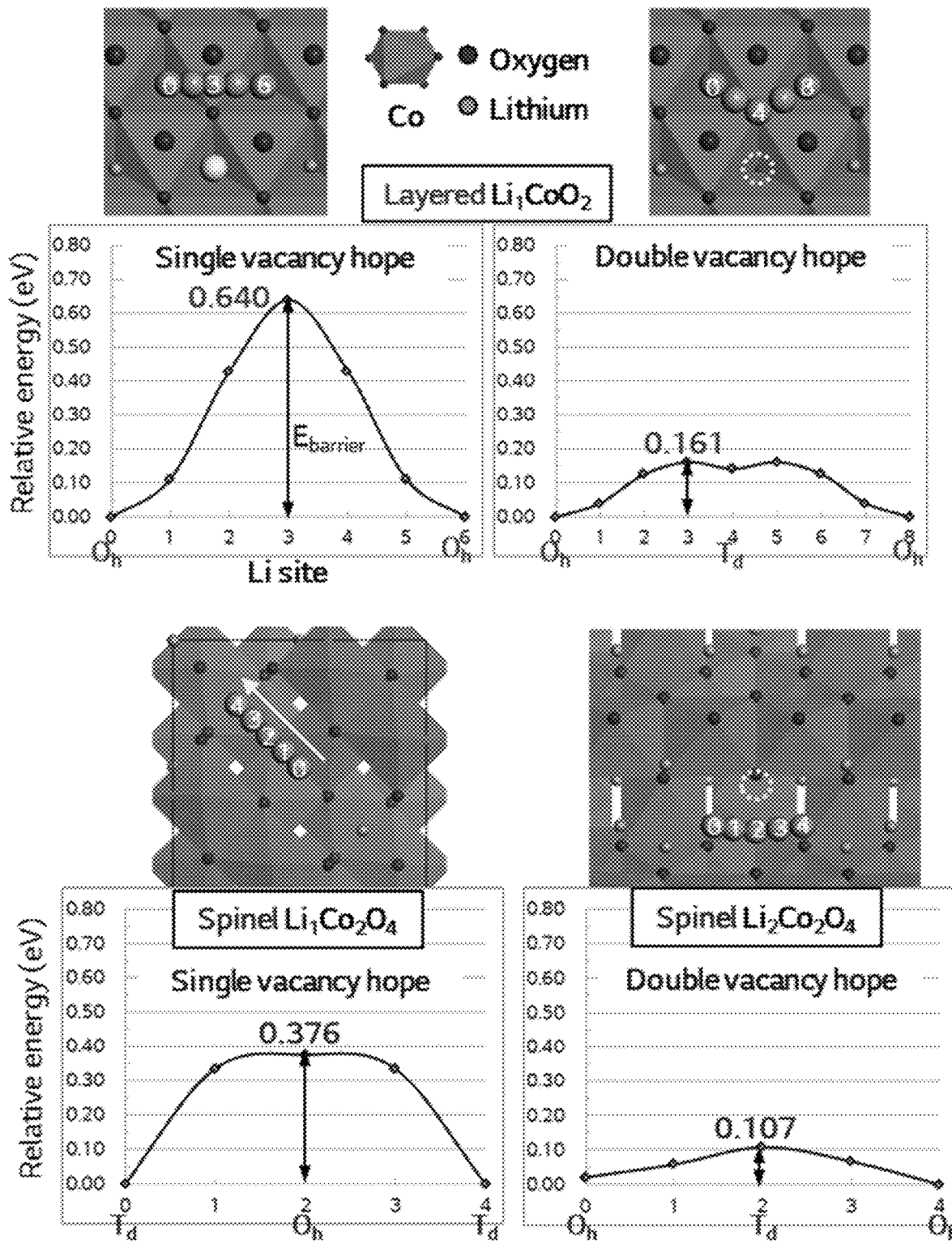

[FIG. 4]
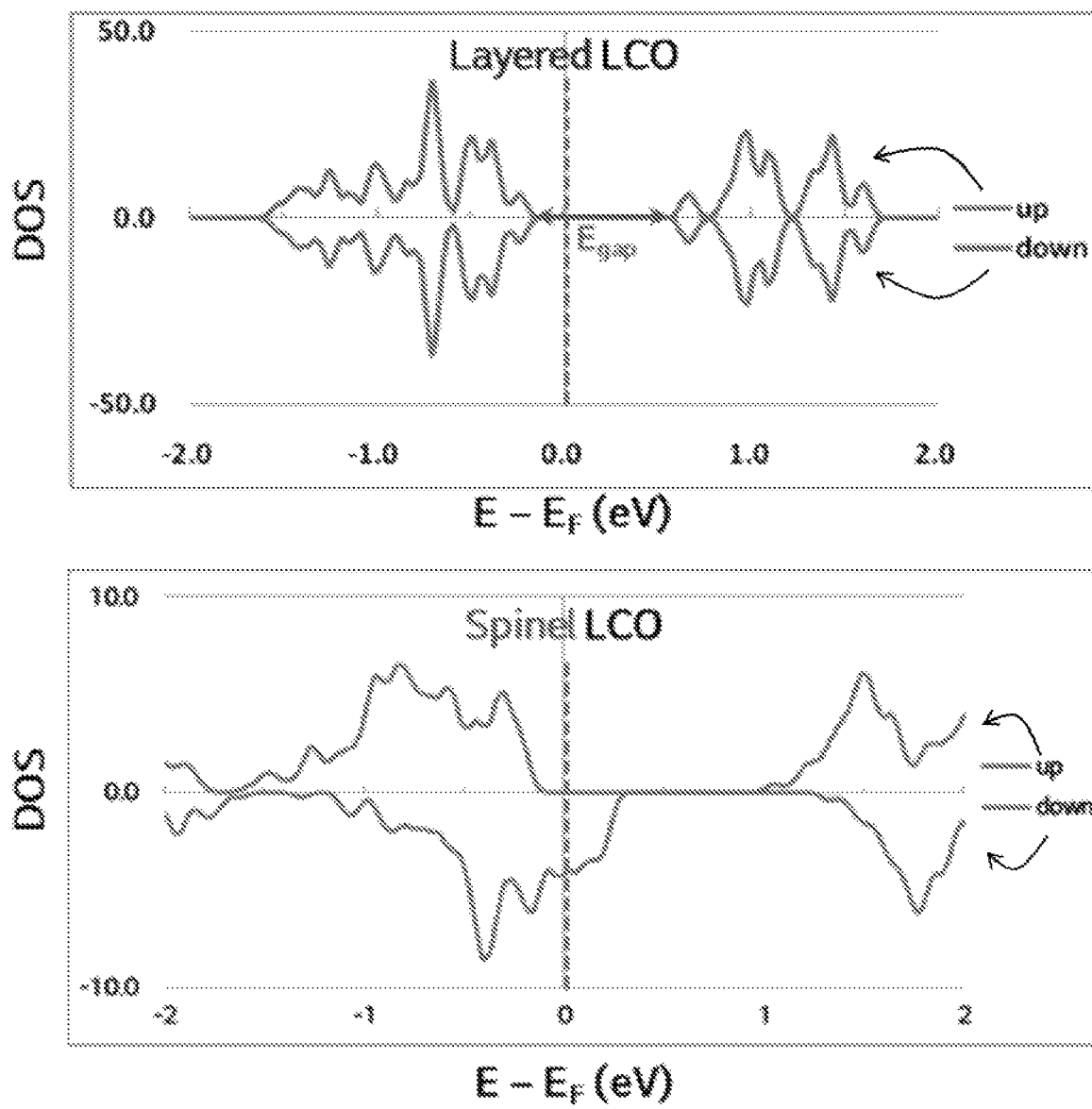

[FIG. 5]
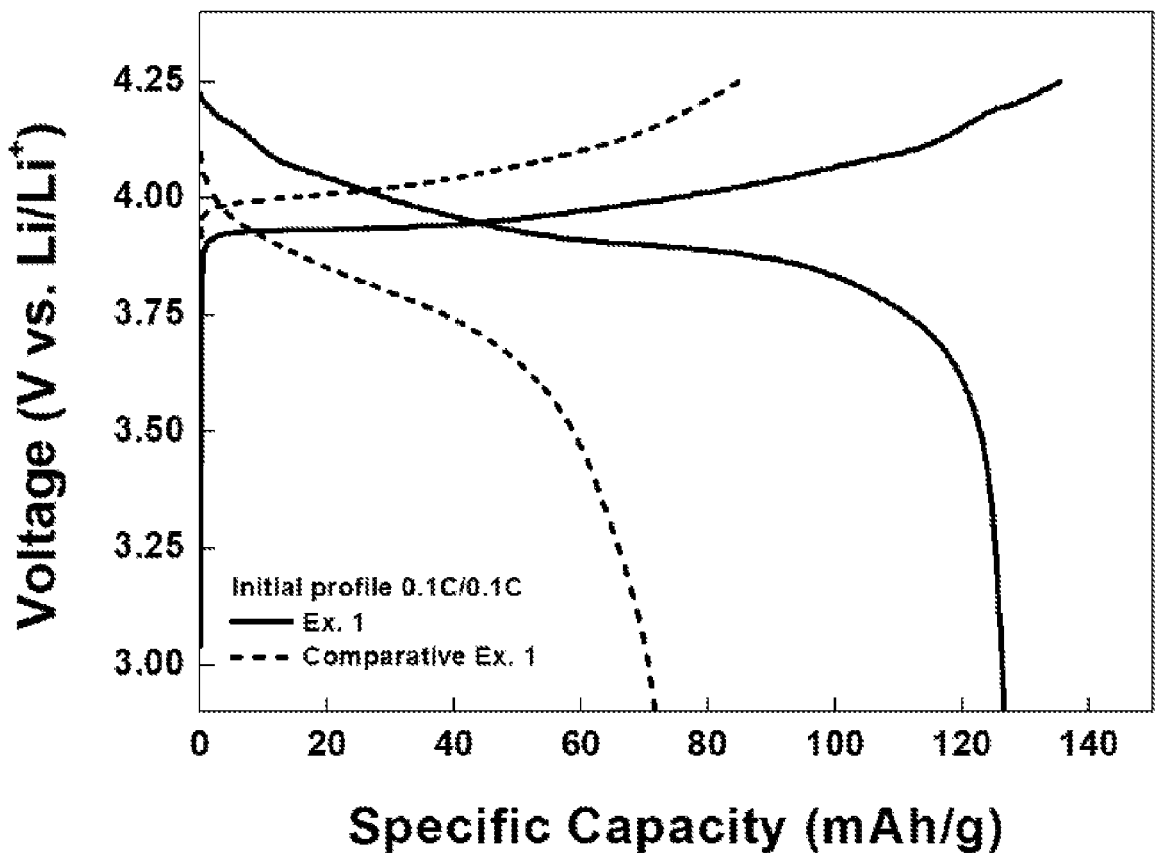

[FIG. 6]
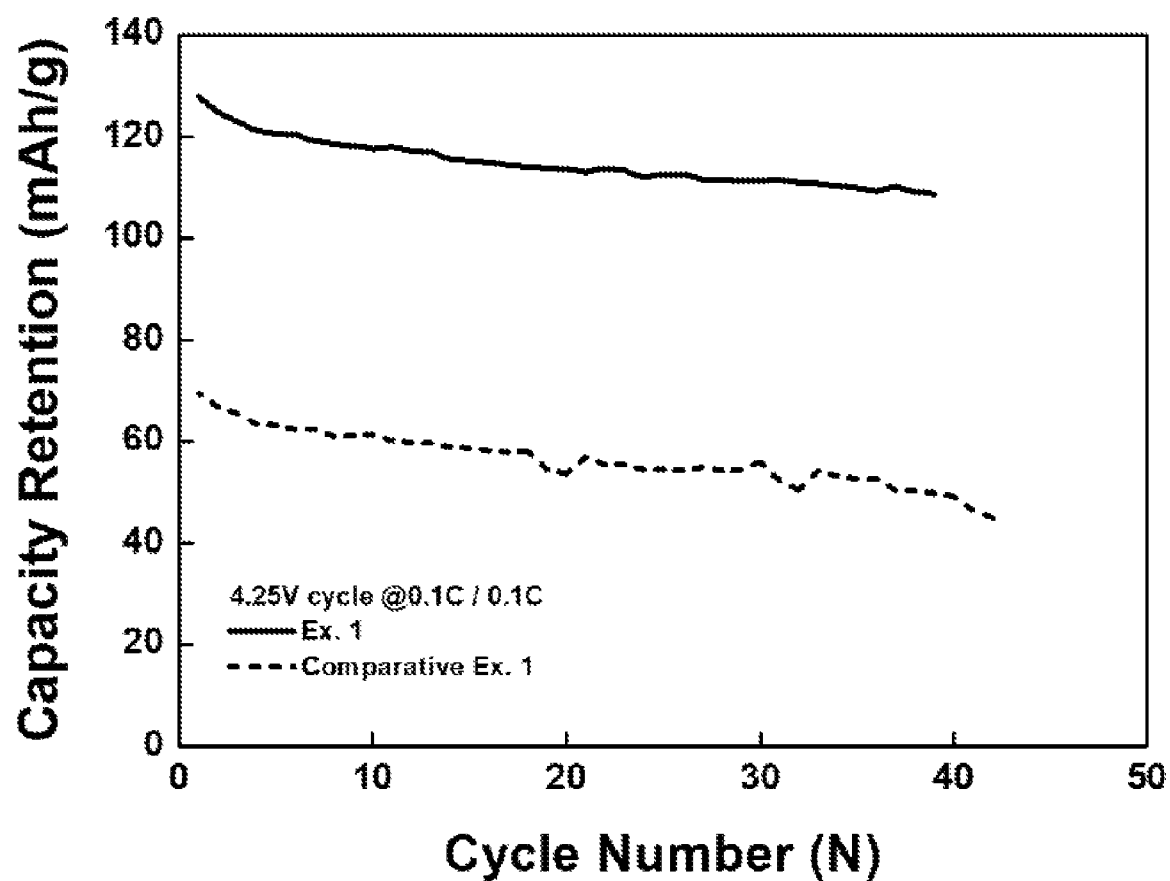

[FIG. 7]
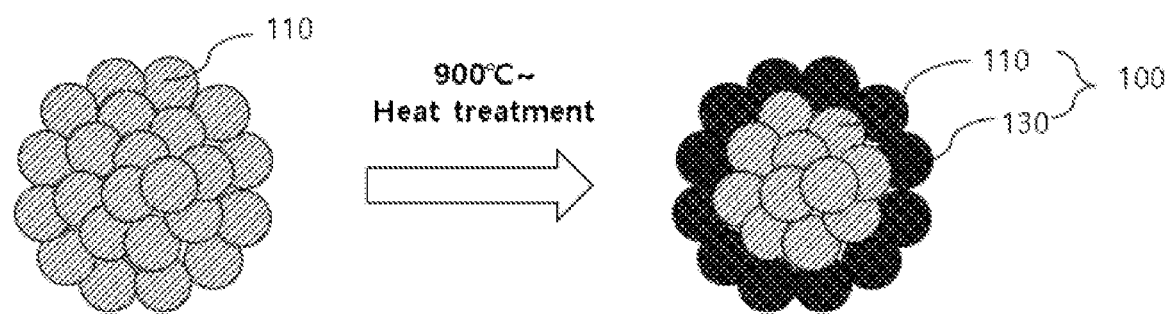

[FIG. 8]
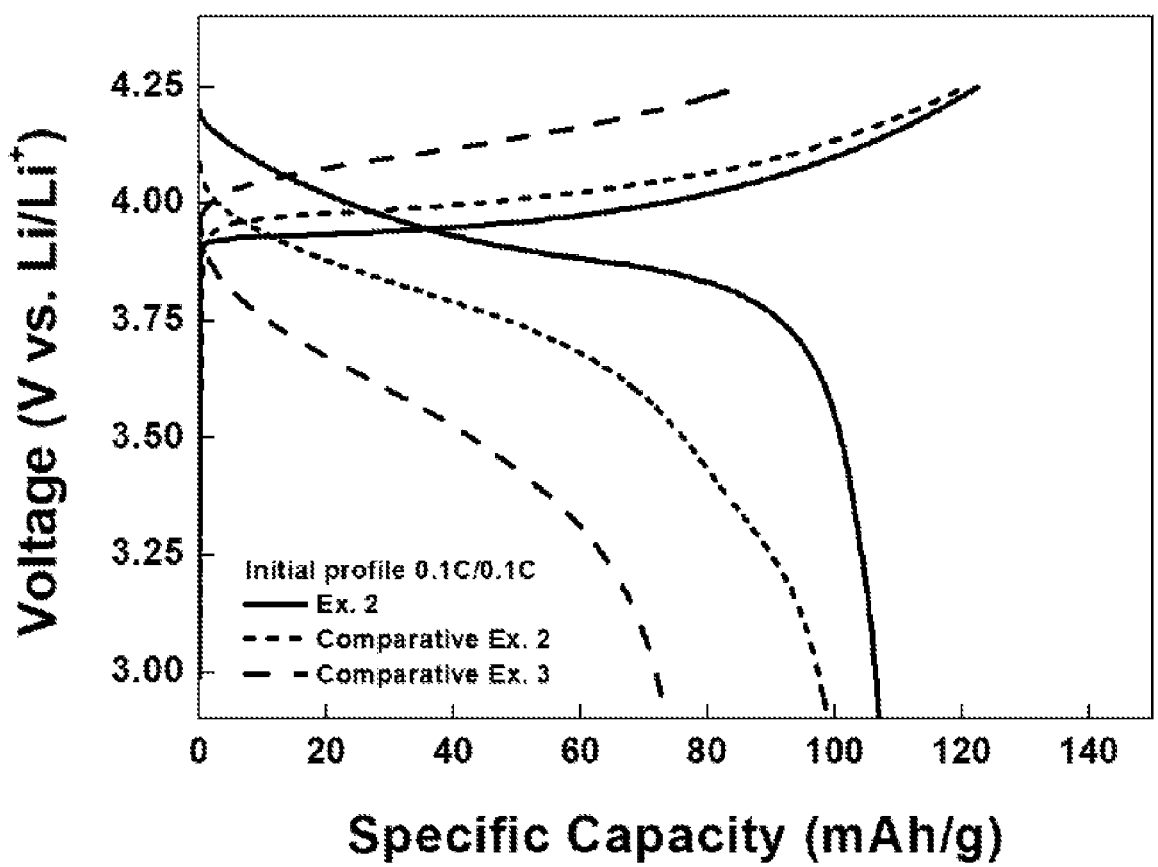

[FIG. 9]
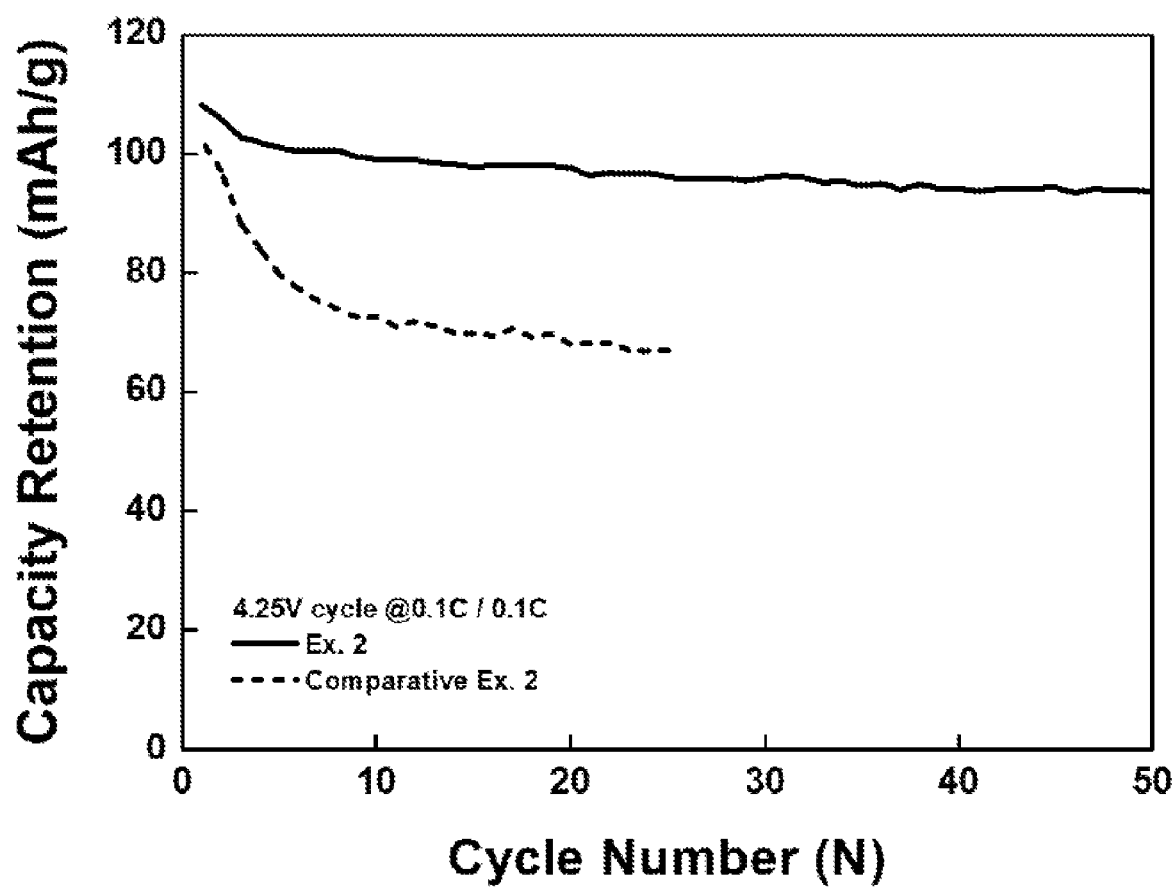

SULFIDE-BASED ALL-SOLID-STATE BATTERY INCLUDING SURFACE HEAT-TREATED POSITIVE ELECTRODE ACTIVE MATERIAL AND METHOD OF MANUFACTURING THE SAME

TECHNICAL FIELD

The present invention relates to a sulfide-based all-solid-state battery including a surface heat-treated positive electrode active material and a method of manufacturing the same, and more particularly to a sulfide-based all-solid-state battery including a surface heat-treated positive electrode active material configured such that the positive electrode active material is heat-treated at 400° C. to 600° C. in an inert gas state, thereby preventing a reaction between the positive electrode active material and a sulfide-based solid electrolyte without a separate coating on the surface of the positive electrode active material, and a method of manufacturing the same.

BACKGROUND ART

A lithium ion secondary battery has advantages in that the lithium ion secondary battery has higher energy density, a lower self-discharge rate, and a longer lifespan than a nickel manganese battery or a nickel cadmium battery. However, the lithium ion secondary battery has disadvantages in that safety of the lithium ion secondary battery is reduced due to overheating thereof and the output of the lithium ion secondary battery is low.

In order to solve problems with the lithium ion secondary battery, an all-solid-state battery has been proposed as an alternative. The all-solid-state battery may be configured to have a structure in which a positive electrode layer including a solid electrolyte and a negative electrode layer are formed on opposite surfaces of an electrolyte layer including a solid electrolyte and a current collector is coupled to each electrode.

Based on the raw material of the solid electrolyte, the all-solid-state battery may be classified as an oxide-based all-solid-state battery, a polymer-based all-solid-state battery, or a sulfide-based all-solid-state battery. The sulfide-based all-solid-state battery has higher lithium ion conductivity than other all-solid-state batteries. However, the sulfide-based all-solid-state battery has disadvantages in that the sulfide-based all-solid-state battery has lower ion conductivity than conventional batteries using a liquid electrolyte and electric resistance between the positive electrode, the negative electrode, and the solid electrolyte is high, whereby the lifespan and output of the sulfide-based all-solid-state battery are low, which have not yet been overcome.

A positive electrode active material and a sulfide-based solid electrolyte react with each other at the interface therebetween, at which time a resistive material that impedes the operation of the all-solid-state battery is formed. The initial capacity and efficiency of the all-solid-state battery are reduced due to such a resistive material.

FIG. 1 is a schematic view of a conventional method of treating the surface of a positive electrode active material. In a conventional all-solid-state battery, the surface of a positive electrode active material 10 is coated with a coating material 20, such as $LiNbO_3$, $Li_2ZrO_3$, $Li_2SiO_3$, or $LiAlO_2$, in order to reduce reactivity of the positive electrode active material with a sulfide-based solid electrolyte. Due to the particle size of the coating material, a portion of the surface of the positive electrode active material 10 may not be coated, or the surface of the positive electrode active material may not be uniformly coated with the coating material 20. In the case in which a portion of the surface of the positive electrode active material is not coated, the positive electrode active material and the solid electrolyte may react with each other at the uncoated portion, whereby safety of the battery may be reduced.

In the case of Patent Document 1, a positive electrode active material is coated with lithium niobate in the state in which an organic solvent is used. Therefore, there is a problem in that the residual organic solvent must be completely evaporated so as not to react with a sulfide-based solid electrolyte before the solid electrolyte is used. In addition, lithium ethoxide and niobium ethoxide are used as a starting material in order to form the lithium niobate. As a result, there are problems in that production cost is high and process time is also lengthened.

PRIOR ART DOCUMENT

Patent Document

Japanese Registered Patent No. 4982866

DISCLOSURE

Technical Problem

The present invention has been made in view of the above problems, and it is an object of the present invention to uniformly coat a positive electrode active material using a simple method such that the positive electrode active material does not react with a sulfide-based solid electrolyte, thereby improving performance and safety of a sulfide-based all-solid-state battery.

Technical Solution

In accordance with an aspect of the present invention, the above and other objects can be accomplished by the provision of a method of manufacturing a sulfide-based all-solid-state battery, the method including S1) heat-treating a positive electrode active material at 400° C. to 600° C. in an inert gas state and S2) forming a unit cell using a positive electrode comprising the heat-treated positive electrode active material, a sulfide-based solid electrolyte, and a negative electrode.

The positive electrode active material may be a lithium cobalt oxide-based positive electrode active material.

Also, in step S1), the positive electrode active material may be heat-treated through a reaction represented by the following reaction scheme.

The reaction scheme may be $Li_xCoO_2$ (layered)→$(1-x)LiCo_2O_4$ (spinel)+$(2x-1)LiCoO_2$ (layered), where x may be 0.5<x<1.

Also, a portion of the surface of the positive electrode active material may be changed from a layered structure to a spinel structure by the heat treatment.

At this time, the interior of the positive electrode active material may maintain the layered structure even after the heat treatment.

The surface of the positive electrode active material having the changed spinel structure may account for 0.5 mol % to 3 mol % of the overall surface of the positive electrode active material.

Also, the positive electrode active material may be refined up to a depth of 50 nm from the surface thereof by the heat treatment.

In step S1), no physical or chemical treatment other than the heat treatment may be performed.

Also, in step S1), no material for surface coating may be added except for heat treatment.

Step S1) may be performed for 1 to 6 hours.

The method may further include S1-2) slowly cooling the positive electrode active material in a glove box after step S1).

The average particle size of the positive electrode active material may range from 1 μm to 100 μm.

The sulfide-based solid electrolyte may be a crystalline solid electrolyte.

Also, the sulfide-based solid electrolyte may be $Li_xPS_yCl_z$ or $Li_xPS_yBr_z$ (where x, y, and z>0).

In accordance with another aspect of the present invention, there may be provided a sulfide-based all-solid-state battery manufactured according to any one of the above methods.

In the present invention, one or more constructions that do not conflict with each other may be selected and combined from among the above constructions.

Effects of the Invention

The present invention provides a method of coating a positive electrode active material without addition of a separate coating material, whereby it is possible to uniformly and stably coat the positive electrode active material.

Reactivity of the positive electrode active material according to the present invention with a sulfide-based solid electrolyte is reduced, whereby interface resistance between the positive electrode active material and the sulfide-based solid electrolyte is reduced. Consequently, safety of a sulfide-based all-solid-state battery is improved, and therefore the capacity and lifespan of the sulfide-based all-solid-state battery are increased.

In addition, a method of manufacturing a sulfide-based all-solid-state battery according to the present invention is capable of simply and easily reducing interface resistance between the positive electrode active material and the sulfide-based solid electrolyte, whereby it is possible to reduce production cost and time.

BRIEF DESCRIPTION OF DRAWINGS

FIG. 1 is a schematic view showing a conventional method of treating the surface of a positive electrode active material.

FIG. 2 is a schematic view showing a method of treating the surface of a positive electrode active material according to the present invention.

FIG. 3 is a graph showing an activation barrier for lithium diffusion in a layered structure and a spinel structure of a lithium cobalt oxide-based positive electrode active material according to the present invention.

FIG. 4 is a graph showing the results of calculation of density of state (DOS) of the layered structure and the spinel structure of the lithium cobalt oxide-based positive electrode active material according to the present invention.

FIG. 5 is a graph showing a comparison in specific capacity between a sulfide-based all-solid-state battery according to Example 1 of the present invention and a sulfide-based all-solid-state battery according to Comparative Example 1.

FIG. 6 is a graph showing a comparison in capacity retention between the sulfide-based all-solid-state battery according to Example 1 of the present invention and the sulfide-based all-solid-state battery according to Comparative Example 1.

FIG. 7 is a schematic view showing a method of treating the surface of a positive electrode active material according to Comparative Example 3.

FIG. 8 is a graph showing a comparison in specific capacity between a sulfide-based all-solid-state battery according to Example 2 of the present invention and sulfide-based all-solid-state batteries according to Comparative Example 2 and Comparative Example 3.

FIG. 9 is a graph showing a comparison in capacity retention between the sulfide-based all-solid-state battery according to Example 2 of the present invention and the sulfide-based all-solid-state battery according to Comparative Example 2.

DETAILED DESCRIPTION OF THE INVENTION

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part in the specification, not only may the one part be directly connected to the other part, but also, the one part may be indirectly connected to the other part via a further part. In addition, that a certain element is included does not mean that other elements are excluded, but means that such elements may be further included unless mentioned otherwise.

In addition, a description of embodying an element by defining or supplementing the element may be applied to all inventions unless there is a specific limitation, and does not define a specific invention.

Also, in the description of the invention of the present application and the claims, singular forms are intended to include plural forms unless mentioned otherwise.

Also, in the description of the invention of the present application and the claims, "or" includes "and" unless mentioned otherwise. Therefore, "including A or B" means three cases, namely, the case including A, the case including B, and the case including A and B.

In addition, all numeric ranges include the lowest value, the highest value, and all intermediate values therebetween unless the context clearly indicates otherwise.

Hereinafter, the present invention will be described in more detail.

FIG. 2 is a schematic view showing a method of treating the surface of a positive electrode active material according to the present invention.

The method of treating the surface of the positive electrode active material according to the present invention includes a step of heat-treating a positive electrode active material 100 at 400° C. to 600° C. in an inert gas state.

At this time, a portion of the surface of the positive electrode active material may be changed to a different structure due to such heat treatment. As an example, a positive electrode active material 100, all molecules of which have a layered structure 110, may be deformed into a spinel structure 120 by heat treatment at 400° C. to 600° C. In the case in which the positive electrode active material 100 is heat-treated at a temperature lower than 400° C., the positive electrode active material 100 is not deformed into the spinel structure 120. In the case in which the positive electrode active material 100 is heat-treated at a temperature higher than 600° C., the positive electrode active material 100 is deformed into a halite state, whereby lithium ion conductivity of the positive electrode active material is reduced.

At this time, the positive electrode active material 100 is not particularly restricted as long as the positive electrode active material is a material that has a structure deformable due to such heat treatment and thus is capable of obtaining the same effect as formation of a coating layer. For example, the positive electrode active material may include a layered compound, such as lithium nickel oxide (LiNiO$_2$), or a compound substituted with one or more transition metals thereof; lithium manganese oxide represented by the chemical formula Li$_{1+x}$Mn$_{2-x}$O$_4$ (where x=0 to 0.33) or lithium manganese oxide, such as LiMnO$_3$, LiMn$_2$O$_3$, or LiMnO$_2$; lithium copper oxide (Li$_2$CuO$_2$); vanadium oxide, such as LiV$_3$O$_8$, LiV$_3$O$_4$, V$_2$O$_5$, or Cu$_2$V$_2$O$_7$; Ni-sited lithium nickel oxide represented by the chemical formula LiN$_{1-x}$M$_x$O$_2$ (where M=Co, Mn, Al, Cu, Fe, Mg, B, or Ga, and x=0.01 to 0.3); lithium manganese composite oxide represented by the chemical formula LiMn$_{2-x}$M$_x$O$_2$ (where M=Co, Ni, Fe, Cr, Zn, or Ta, and x=0.01 to 0.1) or the chemical formula Li$_2$Mn$_3$MO$_8$ (where M=Fe, Co, Ni, Cu, or Zn); LiMn$_2$O$_4$ having Li of a chemical formula partially replaced by alkaline earth metal ions; a disulfide compound; or a mixture of Fe$_2$(MoO$_4$)$_3$, NCM622, and one or all thereof. In addition, known materials may be included. Thereamong, it is preferable that lithium cobalt oxide, which has high energy density, is inexpensive, and is the best, is used.

In addition, the average particle size of the positive electrode active material may be 1 nm to 30 μm, although the present invention is not limited as to the average particle size of the positive electrode active material.

As an example, in the case in which lithium cobalt oxide is used, as described above, the lithium cobalt oxide may be heat-treated through a reaction represented by the following reaction scheme.

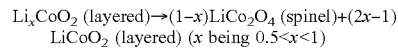
Li$_x$CoO$_2$ (layered)→(1−x)LiCo$_2$O$_4$ (spinel)+(2x−1) LiCoO$_2$ (layered) (x being 0.5<x<1)

At this time, the positive electrode active material 100 having the spinel structure 120 may be present only on the surface of the positive electrode active material. At this time, the surface of the positive electrode active material 100 having the deformed spinel structure 120 may account for 0.5 mol % to 3 mol % of the overall surface of the positive electrode active material. At this time, the positive electrode active material 100 having the spinel structure 120 may be disposed so as to account for 80% or more of the area of the spinel structure 120.

In the case in which the positive electrode active material 100 having the spinel structure 120 accounts for less than 0.5 mol % of the overall surface of the positive electrode active material, the positive electrode active material 100 may react with a sulfide-based solid electrolyte, whereby interface resistance may be increased, and therefore desired effects may not be obtained.

In the case in which the positive electrode active material 100 having the spinel structure 120 accounts for greater than 3 mol % of the overall surface of the positive electrode active material, the positive electrode active material 100 having the spinel structure 120 may reduce overall performance of the positive electrode active material 100, whereby performance of a battery may be reduced.

The positive electrode active material 100 may be refined up to a depth of 50 nm from the surface thereof by heat treatment.

In the case in which the entirety of the positive electrode active material 100 is changed to the spinel structure 120 by heat treatment, electrochemical characteristics are lower than in the case in which the interior of the positive electrode active material 100 has the layered structure 110 and the surface of the positive electrode active material 100 has the spinel structure 120.

This can be understood from FIG. 3, which is a graph showing an activation barrier for lithium diffusion in a layered structure and a spinel structure of a lithium cobalt oxide-based positive electrode active material according to the present invention, and FIG. 4, which is a graph showing the results of calculation of density of state (DOS) of the layered structure and the spinel structure of the lithium cobalt oxide-based positive electrode active material according to the present invention.

As can be seen from the graph showing the activation barrier for lithium diffusion of FIG. 3, the lithium cobalt oxide having the spinel structure has a lower lithium diffusion barrier than the lithium cobalt oxide having the layered structure. Consequently, it can be seen that the lithium cobalt oxide having the spinel structure has higher ion conductivity than the lithium cobalt oxide having the layered structure. In contrast, it can be seen that the activation barrier for diffusion of the lithium cobalt oxide having the layered structure is high, whereby structural stability of the lithium cobalt oxide having the layered structure is excellent.

In addition, as can be seen from FIG. 4, the density of state (DOS) of each of the structures, i.e. the layered structure and the spinel structure, of the lithium cobalt oxide-based positive electrode active material according to the present invention was calculated. At this time, the number of atoms in the uppermost layer of the surface of the lithium cobalt oxide-based positive electrode active material was limited to 4 as the calculation range, and orbital values were arranged accordingly. As a result, it can be seen that the density of state of the lithium cobalt oxide-based positive electrode active material having the layered structure was the highest in the vicinity of −0.7 eV while the density of state of the lithium cobalt oxide-based positive electrode active material having the spinel structure was the highest in the vicinity of −0.5 eV. At this time, the gap of each band was observed, and it can be seen that the band gap of the lithium cobalt oxide-based positive electrode active material having the spinel structure was lower than the band gap of the lithium cobalt oxide-based positive electrode active material having the layered structure. Consequently, it can be seen that the lithium cobalt oxide-based positive electrode active material having the spinel structure has higher lithium ion conductivity than the lithium cobalt oxide-based positive electrode active material having the layered structure.

That is, in the case in which the interior of lithium cobalt oxide has a layered structure and the surface of the lithium cobalt oxide has a spinel structure, it is possible to obtain lithium cobalt oxide that is stable and has improved lithium ion conductivity. Also, in the case in which the surface of the lithium cobalt oxide has the spinel structure, as described above, side reaction with oxygen is reduced, and the performance and capacity of the positive electrode active material are increased.

In addition, a method of manufacturing a sulfide-based all-solid-state battery according to the present invention is not accompanied by physical or chemical treatment other than heat treatment. In the case in which physical or chemical treatment other than heat treatment is performed on the positive electrode active material, properties of the positive electrode active material may be changed, whereby performance of the sulfide-based all-solid-state battery may be reduced. In addition, there is a low possibility of physical or chemical treatment being uniformly performed in a regular fashion, and therefore the positive electrode active material may not be uniformly operated.

In addition, the method of manufacturing the sulfide-based all-solid-state battery according to the present invention is characterized in that no material for surface coating is added for heat treatment, even in the step of heat treatment. In the method of manufacturing the sulfide-based all-solid-state battery according to the present invention, heat of 400° C. to 600° C. is applied to the positive electrode active material in order to change the structure of the positive electrode active material, thereby achieving desired effects. The method of manufacturing the sulfide-based all-solid-state battery according to the present invention is characterized in that the surface of the positive electrode active material is uniformly refined. In the case in which a separate material for surface coating is added at the time of heat treatment, the object of the present invention to uniformly refine the surface of the positive electrode active material may not be achieved, and lithium ion conduction characteristics of the positive electrode active material may be reduced.

In the method of manufacturing the sulfide-based all-solid-state battery according to the present invention, the heat treatment process may be performed for 1 to 6 hours. This may be changed depending on various factors, such as the particle size of the positive electrode active material and weight % of the positive electrode active material. In the case of a positive electrode active material having an average particle size of 1 nm to 30 μm, when the heat treatment process is performed for less than 1 hour, the portion of the surface of the positive electrode active material changed to the spinel structure may be small, whereby interface resistance may be increased as the result of reaction with the sulfide-based solid electrolyte. When the heat treatment process is performed for more than 6 hours, the entirety of the positive electrode active material may be changed to the spinel structure or a portion of the positive electrode active material may be changed to the halite structure, whereby ion conductivity of the positive electrode active material may be reduced and thus performance of the battery may be reduced.

In order to uniformly change the structure of the positive electrode active material, as described above, the present invention may further include a step of slowly cooling the positive electrode active material in a glove box after the heat treatment step. In the case in which the positive electrode active material is slowly cooled after heat treatment, as described above, it is possible to uniformly heat-treat the entirety of the positive electrode active material, and therefore it is possible to refine the surface of a desired portion of the positive electrode active material to a desired extent.

The positive electrode active material may be mixed with a conductive agent and a binder to form a positive electrode slurry. The positive electrode slurry may be applied to a positive electrode current collector to form a positive electrode. A filler may be further added to the positive electrode slurry.

In general, the positive electrode current collector is manufactured so as to have a thickness of 3 μm to 500 μm. The positive electrode current collector is not particularly restricted, as long as the positive electrode current collector exhibits high conductivity while the positive electrode current collector does not induce any chemical change in a battery to which the positive electrode current collector is applied. For example, the positive electrode current collector may be made of one selected from among stainless steel, aluminum, nickel, titanium, and aluminum or stainless steel, the surface of which is treated with carbon, nickel, titanium, or silver. Specifically, the positive electrode current collector may be made of aluminum. The positive electrode current collector may have a micro-scale uneven pattern formed on the surface thereof so as to increase the force of adhesion of the positive electrode active material. The positive electrode current collector may be configured in any of various forms, such as a film, a sheet, a foil, a net, a porous body, a foam body, and a non-woven fabric body.

The conductive agent is generally added so that the conductive agent accounts for 0.1 to 30 wt % based on the total weight of a compound including the positive electrode active material. The conductive agent is not particularly restricted, as long as the conductive agent exhibits high conductivity without inducing any chemical change in a battery to which the conductive agent is applied. For example, graphite, such as natural graphite or artificial graphite; carbon black, such as carbon black, acetylene black, Ketjen black, channel black, furnace black, lamp black, or thermal black; conductive fiber, such as carbon fiber or metallic fiber; metallic powder, such as carbon fluoride powder, aluminum powder, or nickel powder; conductive whisker, such as zinc oxide or potassium titanate; a conductive metal oxide, such as titanium oxide; or a conductive material, such as a polyphenylene derivative, may be used as the conductive agent.

The binder, which is included in the positive electrode, is a component assisting in binding between the positive electrode active material and the conductive agent and in binding with the current collector. The binder is generally added in an amount of 0.1 to 30 wt % based on the total weight of the compound including the positive electrode active material. As examples of the binder, there may be used polyvinylidene fluoride, polyvinyl alcohol, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluoro rubber, and various copolymers.

In addition, the negative electrode used in the present invention may be manufactured by applying a negative electrode active material to a negative electrode current collector and drying the same. The above-described components may be selectively further included as needed.

In general, the negative electrode current collector is manufactured so as to have a thickness of 3 μm to 500 μm. The negative electrode current collector is not particularly restricted, as long as the negative electrode current collector exhibits high conductivity while the negative electrode current collector does not induce any chemical change in a battery to which the negative electrode current collector is applied. For example, the negative electrode current collector may be made of copper, stainless steel, aluminum, nickel, titanium, or plastic carbon. Alternatively, the negative electrode current collector may be made of copper or stainless steel, the surface of which is treated with carbon, nickel, titanium, or silver, or an aluminum-cadmium alloy. In addition, the negative electrode current collector may have a micro-scale uneven pattern formed on the surface thereof so as to increase the force of adhesion of the negative electrode active material, in the same manner as the positive electrode current collector. The negative electrode current collector may be configured in any of various forms, such as a film, a sheet, a foil, a net, a porous body, a foam body, and a non-woven fabric body.

As the negative electrode active material, for example, there may be used carbon, such as a non-graphitizing carbon or a graphite-based carbon; a metal composite oxide, such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge; Me': Al, B, P, Si, Group 1, 2, and 3 elements of the periodic table, halogen; $0 \leq x \leq 1$; $1 \leq y \leq 3$; $1 \leq z \leq 8$); lithium metal; lithium alloy; silicon-based alloy; tin-based alloy; a metal oxide, such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, or $Bi_2O_5$; a conductive polymer, such as polyacetylene; or a Li—Co—Ni based material.

When the positive electrode and the negative electrode are formed, a sulfide-based solid electrolyte particle, i.e. a sulfide-based particle, must be included in the positive electrode slurry and the negative electrode slurry. The surface of the sulfide-based particle may be coated or refined, and a sulfide-based solid electrolyte is manufactured through a dry and wet process using a mixture including the particle.

In the present invention, the sulfide-based particle is not particularly restricted, and all known sulfide-based materials used in the field of lithium batteries are possible. A commercial product or a material manufactured by crystallizing an amorphous sulfide-based material may be used as the sulfide-based material.

Typically, $Li_6PS_5Cl$ (LPSCl), thio-LISICON ($Li_{3.25}Ge_{0.25}P_{0.75}S_4$) $Li_2S$—$P_2S_5$—LiCl, $Li_2S$—$SiS_2$, LiI—$Li_2S$—$SiS_2$, LiI—$Li_2S$—$P_2S_5$, LiI—$Li_2S$—$P_2O_5$, LiI—$Li_3PO_4$—$P_2S_5$, $Li_2S$—$P_2S_5$, $Li_3PS_4$, $Li_7P_3S_{11}$, LiI—$Li_2S$—$B_2S_3$, $Li_3PO_4$—$Li_2S$—$Si_2S$, $Li_3PO_4$—$Li_2S$—$SiS_2$, $LiPO_4$—$Li_2S$—SiS, $Li_{10}GeP_2S_{12}$, $Li_{9.54}Si_{1.74}P_{1.44}S_{11.7}Cl_{0.3}$, and $Li_7P_3S_{11}$ are included. At this time, it is preferable that the solid electrolyte be a crystal system having high stability to lithium metal and reasonable ion conductivity allowing high ionic load. The sulfide-based solid electrolyte may be $Li_xPS_yCl_z$ or $Li_xPS_yBr_z$ (where x, y, and z>0).

In addition, the above-described solid electrolyte may also be used as the sulfide-based solid electrolyte for the solid electrolyte layer according to the present invention.

The positive electrode, the sulfide-based solid electrolyte layer, and the negative electrode may constitute a jelly-roll type assembly, which is configured to have a structure in which the positive electrode, the sulfide-based solid electrolyte layer, and the negative electrode are wound after being stacked, a stacked type assembly, which is configured to have a structure in which a rectangular positive electrode and a rectangular negative electrode are stacked in the state in which a solid electrolyte is interposed between the positive electrode and the negative electrode, a stack/folded type assembly, which is configured to have a structure in which unit cells, each of which includes a positive electrode, a sulfide-based solid electrolyte layer, and a negative electrode, are wound in the state in which the unit cells are disposed on a long separation film, or a laminated/stacked type assembly, which is configured to have a structure in which the unit cells are stacked so as to be attached to each other in the state in which a solid electrolyte layer is interposed between the unit cells. However, the present invention is not limited thereto.

In addition, the present invention provides a battery pack including the above-described unit cell as a unit battery and a device including the battery pack as a power source. Specifically, the battery pack may be used as a power source for a device requiring the ability to withstand high temperature, a long lifespan, high rate characteristics, etc. Preferred examples of the device may include a mobile electronic device, a wearable electronic device, a power tool driven by a battery-powered motor, an electric vehicle (EV), a hybrid electric vehicle (HEV), a plug-in hybrid electric vehicle (PHEV), and a power storage apparatus. However, the present invention is not limited thereto.

The structure and manufacturing method of the device are well known in the art to which the present invention pertains, and thus a detailed description thereof will be omitted from this specification.

Hereinafter, Example using a positive electrode active material heat-treated as described above and Comparative Example 1 using a positive electrode active material not heat-treated and Comparative Example 2 having a high heat treatment temperature were compared in terms of specific capacity and capacity retention through experimentation.

Example 1

Lithium cobalt oxide from Sigma Company was put into a stirrer, and heat treatment was performed at 450° C. for 2 hours. Subsequently, 66 wt % of the resulting positive electrode active material was mixed with 1 wt % of carbon black, as a conductive agent, and 33 wt % of $Li_6PS_5Cl$, as a sulfide-based solid electrolyte, to form a positive electrode.

The positive electrode, a solid electrolyte layer formed using an LPS-based electrolyte, as a solid electrolyte, and a negative electrode using copper as a current collector were stacked to form a unit cell.

Comparative Example 1

A unit cell was formed in the same manner as in Example 1 except that the lithium cobalt oxide of Example 1 was not heat-treated after being put into the stirrer.

Experimental Example 1

The unit cells according to Example 1 and Comparative Example 1 were charged under conditions of (CC/CV): 0.1 C/4.15V, 0.02 C cut-off, and rest 30 min, and were discharged under conditions of (CC): 0.1 C and 3V cut off. At this time, specific capacity was calculated based on weight including a positive electrode material of the positive electrode and a gas diffusion layer. The result of calculation is shown in FIG. 5.

FIG. 5 is a graph showing a comparison in specific capacity between a sulfide-based all-solid-state battery according to Example 1 of the present invention and a sulfide-based all-solid-state battery according to Comparative Example 1. It can be seen from FIG. 5 that, in the case of the unit cell according to Example 1, an oxygen reduction curve corresponding to a first cycle was 135 mAh/g and an oxygen release curve was 128 mAh/g, and therefore there was a difference of about 94.4%. In contrast, the oxygen reduction curve of Comparative Example 1 was 85 mAh/g and the oxygen release curve of Comparative Example 1 was 74 mAh/g, and therefore there was a difference of about 87.5% in initial charge and discharge characteristics. Consequently, it can be seen that the charge and discharge characteristics of the unit cell according to Example 1 are better than the charge and discharge characteristics of the unit cell according to Comparative Example 1.

Experimental Example 2

The unit cells according to Example 1 and Comparative Example 1 were charged under conditions of (CC/CV): 0.1 C/4.25V, 0.02 C cut-off, and rest 30 min, and were discharged under conditions of (CC): 0.1 C and 3V cut off. Charging and discharging were performed 50 times.

FIG. 6 is a graph showing a comparison in capacity retention between the sulfide-based all-solid-state battery according to Example 1 of the present invention and the sulfide-based all-solid-state battery according to Comparative Example 1. It can be seen from FIG. 6 that, in the case of the unit cell according to Example 1, initial capacity was higher than in Comparative Example 1, and the gradient of the capacity decrease graph was smaller than in Comparative Example 1, whereby capacity retention was better than in Comparative Example 1.

Example 2

A unit cell was formed using lithium cobalt oxide from MTI Company in the same manner as in Example 1.

Comparative Example 2

A unit cell was formed using lithium cobalt oxide from MTI Company of Example 2 in the same manner as in Comparative Example 1.

Comparative Example 3

Lithium cobalt oxide from MTI Company of Example 2 was heat-treated using a method shown in FIG. 7. FIG. 7 is a schematic view showing a method of treating the surface of a positive electrode active material according to Comparative Example 3. It can be seen from FIG. 7 that, in the case in which lithium cobalt oxide is heat-treated at 900° C. or hither, a layered structure 110 of the positive electrode active material is changed to a halide structure 130. In Comparative Example 3, a unit cell was formed in the same manner as in Example 2 except for the heat treatment temperature.

Experimental Example 3

Specific capacity of each of Example 2, Comparative Example 2, and Comparative Example 3 was calculated in the same manner as in Experimental Example 1. The result of calculation is shown in FIG. 8.

FIG. 8 is a graph showing a comparison in specific capacity between a sulfide-based all-solid-state battery according to Example 2 of the present invention and sulfide-based all-solid-state batteries according to Comparative Example 2 and Comparative Example 3. It can be seen from FIG. 8 that, in the case of the unit cell according to Example 2, an oxygen reduction curve corresponding to a first cycle was 125 mAh/g and an oxygen release curve was 109 mAh/g, and therefore there was a difference of about 88.4%. In contrast, the oxygen reduction curve of Comparative Example 2 was 121 mAh/g and the oxygen release curve of Comparative Example 2 was 102 mAh/g, and therefore there was a difference of about 84.9% in initial charge and discharge characteristics. In addition, the oxygen reduction curve of Comparative Example 3 was 95 mAh/g and the oxygen release curve of Comparative Example 3 was 77 mAh/g, and therefore there was a difference of about 81.0% in initial charge and discharge characteristics.

Consequently, it can be seen that the charge and discharge characteristics of the unit cell according to Example 2 are better than the charge and discharge characteristics of the unit cells according to Comparative Example 2 and Comparative Example 3.

Experimental Example 4

Capacity retention of each of Example 2 and Comparative Example 2 was calculated in the same manner as in Experimental Example 2. The result of calculation is shown in FIG. 9. FIG. 9 is a graph showing a comparison in capacity retention between the sulfide-based all-solid-state battery according to Example 2 of the present invention and the sulfide-based all-solid-state battery according to Comparative Example 2.

It can be seen from FIG. 9 that, in the case of the unit cell according to Example 2, initial capacity was higher than in Comparative Example 2, and the gradient of the capacity decrease graph was smaller than in Comparative Example 2, whereby capacity retention was better than in Comparative Example 2.

Consequently, it can be seen that performance of a sulfide-based all-solid-state battery using a heat-treated positive electrode active material, as in the present invention, is better than performance of an all-solid-state battery using a positive electrode active material heat-treated at temperatures deviating from a heat treatment temperature or a positive electrode active material that has not been heat-treated.

Although the present invention has been described in detail, those skilled in the art will appreciate that the detailed description thereof discloses only preferred embodiments of the present invention and thus does not limit the scope of the present invention. Accordingly, those skilled in the art will appreciate that various changes and modifications are possible, without departing from the category and the technical idea of the present invention, and it will be obvious that such changes and modifications fall within the scope of the appended claims.

The invention claimed is:

1. A method of manufacturing a sulfide-based all-solid-state battery, the method comprising:
   S1) heat-treating a positive electrode active material at 400° C. to 600° C. in an inert gas state; and
   S2) forming a unit cell using a positive electrode comprising the heat-treated positive electrode active material, a sulfide-based solid electrolyte, and a negative electrode,
   wherein, in step S1), the positive electrode active material is heat-treated through a reaction represented by the following reaction scheme:

$Li_xCoO_2$ (layered)→$(1-x)LiCo_2O_4$ (spinel)+$(2x-1)$
   $LiCoO_2$ (layered) ($x$ being $0.5<x<1$).

2. The method according to claim 1, wherein the positive electrode active material is a lithium cobalt oxide-based positive electrode active material.

3. The method according to claim 1, wherein a portion of a surface of the positive electrode active material is changed from a layered structure to a spinel structure by the heat-treating.

4. The method according to claim 3, wherein an interior of the positive electrode active material maintains the layered structure even after the heat-treating.

5. The method according to claim 3, wherein the surface of the positive electrode active material having the changed spinel structure accounts for 0.5 mol % to 3 mol % of an overall surface of the positive electrode active material.

6. The method according to claim 1, wherein the positive electrode active material having a spinel structure is present up to a depth of 50 nm from a surface thereof by the heat-treating.

7. The method according to claim 1, wherein, in step S1), no physical or chemical treatment other than the heat-treating is performed.

8. The method according to claim 1, wherein step S1) is performed for 1 to 6 hours.

9. The method according to claim 1, further comprising S1-2) cooling the positive electrode active material in a glove box after step S1).

10. The method according to claim 1, wherein an average particle size of the positive electrode active material ranges from 1 μm to 100 μm.

11. The method according to claim 1, wherein the sulfide-based solid electrolyte is a crystalline solid electrolyte.

12. The method according to claim 11, wherein the sulfide-based solid electrolyte is $Li_6PS_5Cl$, $Li_{3.25}Ge_{0.25}P_{0.75}S_4$, $Li_2S$—$P_2S_5$—$LiCl$, $Li_2S$—$SiS_2$, $LiI$—$Li_2S$—$SiS_2$, $LiI$—$Li_2S$—$P_2S_5$, $LiI$—$Li_2S$—$P_2O_5$, $LiI$—$Li_3PO_4$—$P_2S_5$, $Li_2S$—$P_2S_5$, $Li_3PS_4$, $Li_7P_3S_{11}$, $LiI$—$Li_2S$—$B_2S_3$, $Li_3PO_4$—$Li_2S$—$Si_2S$, $Li_3PO_4$—$Li_2S$—$SiS_2$, $LiPO_4$—$Li_2S$—$SiS$, $Li_{10}GeP_2S_{12}$, $Li_{9.54}Si_{1.74}P_{1.44}S_{11.7}Cl_{0.3}$, or $Li_7P_3S_{11}$.

13. A sulfide-based all-solid-state battery manufactured by the method according to claim 1.

* * * * *